March 4, 1930.  J. M. PESTARINI  1,749,673
DYNAMO ELECTRIC MACHINE
Filed Aug. 10, 1926  3 Sheets-Sheet 2

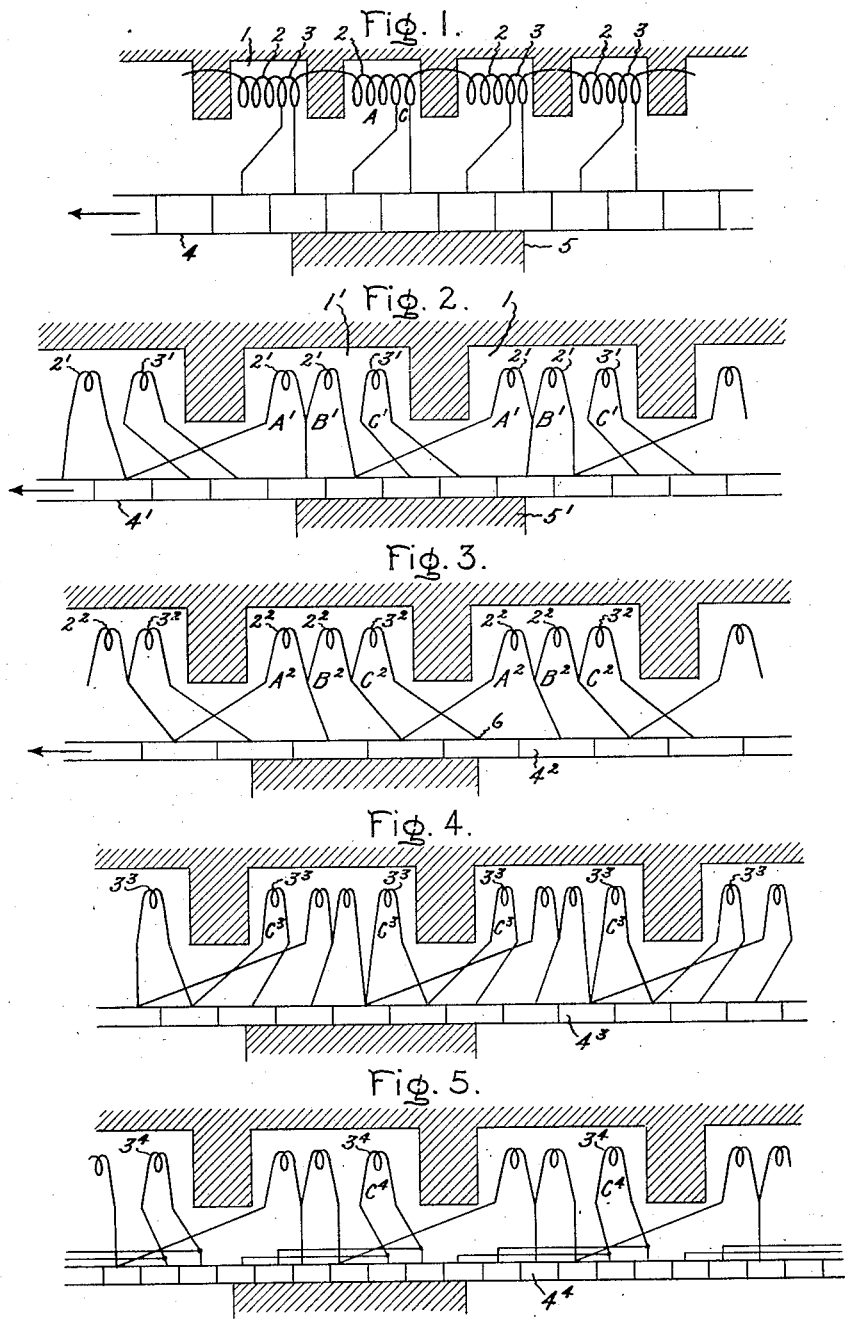

Inventor:
Joseph M. Pestarini,
by Charles E. Tullar
His Attorney.

March 4, 1930.  J. M. PESTARINI  1,749,673
DYNAMO ELECTRIC MACHINE
Filed Aug. 10, 1926   3 Sheets-Sheet 3

Inventor:
Joseph M. Pestarini,
by Charles E. Mullan
His Attorney.

Patented Mar. 4, 1930

1,749,673

UNITED STATES PATENT OFFICE

JOSEPH M. PESTARINI, OF ST.-OUEN, FRANCE, ASSIGNOR TO GENERAL ELECTRIC COMPANY, A CORPORATION OF NEW YORK

DYNAMO-ELECTRIC MACHINE

Application filed August 10, 1926, Serial No. 128,493, and in France October 8, 1925.

My invention relates to dynamo electric machines having armatures of the commutator type, and has for its object to improve the commutation of such machines. In accordance with my invention, I eliminated the self-induction of commutation by employing a short circuited secondary to the armature coil undergoing commutation which remains short-circuited only until the load current in the main conductors of the armature winding has reversed and built up.

For a better understanding of my invention, reference may be had to the following description, taken in connection with the accompanying drawing, in which Fig. 1 shows diagrammatically an armature winding embodying my invention; Fig. 2 shows a modification of the arrangement of Fig. 1 and is particularly applicable to an armature designed to run in the direction of the arrow; Fig. 3 is a modification of Fig. 2; Fig. 4 is another embodiment of my invention designed particularly for the case in which the armature may rotate in either direction; Fig. 5 is a modification of the arrangement of Fig. 4, and Figs. 6 to 10, inclusive, show the arrangements of Figs. 1 to 5, respectively, applied to lap windings for a drum armature.

Figure 6:
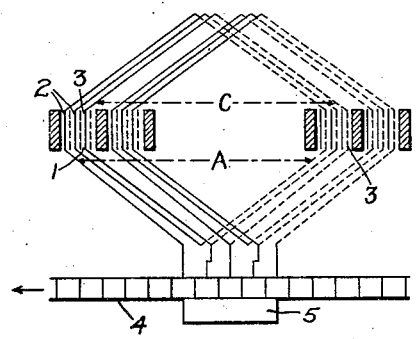

Referring to Figures 1 and 6, there is shown an armature provided with slots 1 in which is wound an armature winding comprising main conductors 2 and auxiliary conductors 3. The main and auxiliary conductors are connected to a single commutator 4. It will be noted in these figures that the auxiliary conductors 3 are connected in series with the main conductors 2 so that the main and auxiliary conductors together form a single winding. The coils comprising the auxiliary conductors 3 are wound on the armature in the same direction as the corresponding coils comprising the main conductors 2. On the commutator 4 are arranged brushes 5 for conducting the load current produced by the main conductors of the armature winding away from the machine and also for short circuiting the coils comprising the auxiliary conductors. Each of the brushes 5 is of such a width that it will short circuit a coil C comprising the auxiliary conductors 3 when commutation of a corresponding coil A comprising main conductors 2 takes place and keeps the coil comprising the auxiliary conductors short circuited during commutation of the coil comprising the main conductors until the current induced in the coil C comprising the auxiliary conductors by the reversal of load current in the corresponding coil comprising the main conductors has died out. The corresponding commutator segment of commutator 4, to which coil C is connected, then moves out of engagement with brush 5 and opens the short-circuit of coil C. The auxiliary conductors 3 are placed adjacent the corresponding main conductors 2 and in the same slots. For the sake of simplicity, the auxiliary and main conductors are shown in the drawing side by side. In the actual construction of the machine, however, the main and auxiliary conductors are wound so as to have maximum mutual inductance between them.

Figure 7:
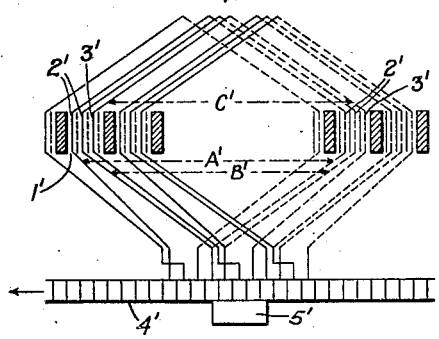

In the arrangement shown in Figs. 2 and 7 of the drawing, the slots 1' have main conductors 2' and auxiliary conductors 3'. The main conductors 2' in all the slots are connected up to form a single winding independent of the auxiliary conductors 3'. The auxiliary conductors 3' are connected to commutator segments of the commutator 4' interleaved between the commutator segments to which the winding comprising main conductors 2' are connected. It will, therefore, be seen that the coils formed by the auxiliary conductors are never in the circuit of the main winding. The coils comprising the auxiliary conductors 3' are wound on the armature in the same direction as the corresponding coils comprising the main conductors 2'. In the arrangement shown in this figure, the armature is designed for operation in the direction of the arrow.

The operation of the armature shown in Figs. 2 and 7 is as follows: Supposing that the brush 5' remains stationary and the armature and commutator move in the direction of the arrow, the brush short circuits the coil A' of the armature winding comprising main conductor 2', then, an instant later, the coil B' of the armature winding comprising main conductor is short circuited. The coil B' remains short circuited at the moment that the short circuit of the coil A' is broken. The coil B' thus plays the part of a secondary in short circuit relation to coil A'. Then the coil C' comprising the auxiliary conductors 3' is short circuited and remains short circuited at the moment of the breaking of the short circuit of the coil B'. Coil C' plays the part of a secondary in short circuit relation to coil B', at the most opportune moment to favor the good commutation of this section of the armature winding; coil C remaining short circuited until the current induced therein by the reversal of the load current in the coil B' has died out. The commutator segment to which coil C' is connected then moves out from under brush 5' and opens the short circuit of coil C'.

Figure 8:
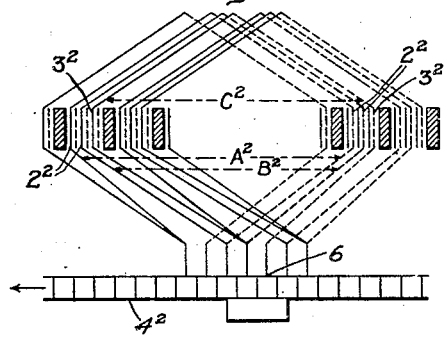

The arrangement shown in Figs. 3 and 8 is very similar to that of Figs. 2 and 7 except that one end of each coil comprising the auxiliary conductors $3^2$ is connected to the same commutator segment of the commutator $4^2$ as the end of a coil formed of the main conductors $2^2$ of the armature winding. The other end 6 of the coil comprising the auxiliary conductor is connected to a commutator segment which is not connected to a coil of the armature comprising the main conductors $2^2$.

Figure 9:
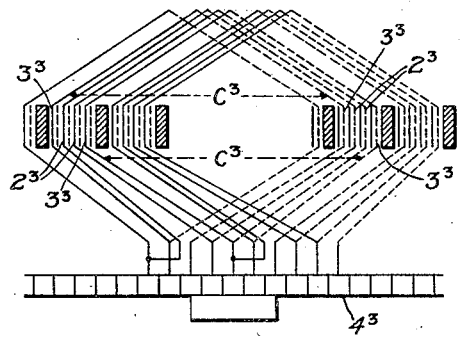

Figs. 4 and 9 show a similar arrangement to Figs. 3 and 8 except that there is located in each slot two coils $C^3$ $C^3$ comprising auxiliary conductors $3^3$. These coils comprising the auxiliary conductors are connected to commutator segments of the commutator $4^3$ so that one of these auxiliary coils is short circuited at the moment when the short circuit of one of the end coils of the main winding located in the same slot is broken, no matter in what direction the armature is rotated.

Figure 10:
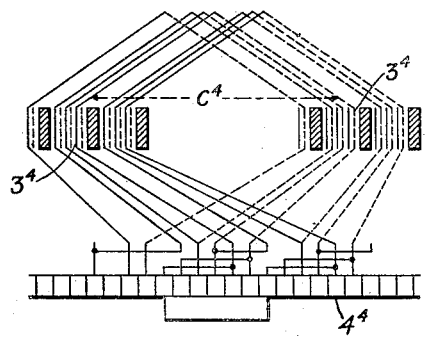

In the arrangement shown in Figs. 5 and 10, there is a single coil $C^4$ comprising auxiliary conductors $3^4$. This single coil however, is connected to four segments of the commutator $4^4$. These four segments are segments to which none of the coils comprising the main conductors is connected. It is readily seen from these figures of the drawing that this single coil $C^4$ will be short circuited no matter in which direction the armature rotates and will remain short circuited until the current induced in the coil by the reversal of the load current in the coils comprising main conductors $3^4$ has died out.

I desire it to be understood that my invention is applicable to alternating current dynamo electric machines as well as direct current dynamo electric machines, and I aim in the appended claims to cover all modifications which do not depart from the spirit and scope of my invention.

What I claim as new and desire to secure by Letters Patent of the United States is:

1. In a dynamo electric machine, an armature, an armature winding thereon comprising main conductors and auxiliary conductors, a single commutator to which said main and auxiliary conductors are connected, coils comprising said auxiliary conductors being wound on said armature in the same direction as corresponding coils comprising the main conductors, and means for short circuiting coils comprising said auxiliary conductors when commutation of corresponding coils comprising said main conductors takes place and keeping said coils comprising said auxiliary conductors short circuited during commutation of said coils comprising said main conductors and until the current induced in said coils comprising said auxiliary conductors by the reversal of the load current in the corresponding coils comprising said main conductors has died out.

2. In a dynamo electric machine, an armature, an armature winding thereon comprising said main conductors and auxiliary conductors, the auxiliary and main conductors being arranged so as to have the maximum mutual inductance between them, a single commutator to which said main and auxiliary conductors are connected, coils comprising said auxiliary conductors being wound on said armature in the same direction as corresponding coils comprising the main conductors, and means for short circuiting coils comprising said auxiliary conductors when commutation of corresponding coils comprising said main conductors takes place and keeping said coils comprising said auxiliary conductors short circuited during commutation of said coils comprising said main conductors and until the current induced in said coils comprising said auxiliary conductors by the reversal of the load current in the corresponding coils comprising said main conductors has died out.

3. In a dynamo electric machine, an armature, an armature winding thereon comprising main conductors and auxiliary conductors, the auxiliary conductors being placed closely adjacent the corresponding main conductors and in the same slot so as to have maximum mutual inductance between them, a single commutator to which said main and auxiliary conductors are connected, coils comprising said auxiliary conductors being wound on said armature in the same direction as corresponding coils comprising the main conductors, and means for short circuiting coils comprising said auxiliary conductors when commutation of corresponding coils comprising said main conductors takes place and keeping said coils comprising said auxiliary conductors short circuited during commutation of said coils comprising said main conductors and until the current induced in said coils comprising said auxiliary conductors by the reversal of the load current in the corresponding coils comprising said main conductors has died out.

4. In a dynamo electric machine, an armature, an armature winding thereon comprising main conductors and auxiliary conductors, a single commutator to which said main and auxiliary conductors are connected, and brushes on said commutator, each of said brushes being of such width so as to short circuit a coil comprising said auxiliary conductors when commutation of a corresponding coil comprising said main conductors takes place and keeping said coil comprising said auxiliary conductors short circuited during commutation of said coil comprising said main conductors and until the current induced in said coil comprising said auxiliary conductors by the reversal of load current in said corresponding coil comprising said main conductors has died out.

5. In a dynamo electric machine, an armature, an armature winding thereon comprising main conductors and auxiliary conductors, the auxiliary and main conductors being arranged so as to have the maximum mutual inductance between them, a single commutator to which said main and auxiliary conductors are connected, and brushes on said commutator, each of said brushes being of such width so as to short circuit a coil comprising said auxiliary conductors when commutation of a corresponding coil comprising said main conductors takes place and keeping said coil comprising said auxiliary conductors short circuited during commutation of said coil comprising said main conductors and until the current induced in said coil comprising said auxiliary conductors by the reversal of load current in said corresponding coil comprising said main conductors has died out.

6. In a dynamo electric machine, an armature, an armature winding thereon comprising main conductors and auxiliary conductors, the auxiliary conductors being placed adjacent the corresponding main conductors and in the same slots so as to have maximum mutual inductance between them, a single commutator to which said main and auxiliary conductors are connected, and brushes on said commutator, each of said brushes being of such width so as to short circuit a coil comprising said auxiliary conductors when commutation of a corresponding coil comprising said main conductors takes place and keeping said coil comprising said auxiliary conductors short circuited during commutation of said coil comprising said main conductors and until the current induced in said coil comprising said auxiliary conductors by the reversal of load current in said corresponding coil comprising said main conductors has died out.

In witness whereof, I have hereunto set my hand.

JOSEPH M. PESTARINI.